United States Patent

[11] 3,604,287

| [72] | Inventor | Donald R. Humphreys<br>Topsfield, Mass. |
|---|---|---|
| [21] | Appl. No. | 847,572 |
| [22] | Filed | Aug. 5, 1969 |
| [45] | Patented | Sept. 14, 1971 |
| [73] | Assignee | USM Corporation<br>Boston, Mass. |

[54] MODIFIED HARMONIC-DRIVE ACTUATORS
8 Claims, 10 Drawing Figs.

[52] U.S. Cl.................................................. 74/640, 74/804
[51] Int. Cl................................................ F16h 37/00, F16h 1/00
[50] Field of Search.......................................... 74/640, 804, 805

[56] References Cited
UNITED STATES PATENTS

| 2,849,897 | 9/1958 | Walma | 74/804 |
|---|---|---|---|
| 3,058,372 | 10/1962 | Robinson | 74/640 |
| 3,117,468 | 1/1964 | Musser | 74/640 |
| 3,160,032 | 12/1964 | Black | 74/804 |
| 3,178,963 | 4/1965 | Musser | 74/640 |
| 3,199,370 | 8/1965 | Prior | 74/640 |
| 3,363,484 | 1/1968 | Slaughter | 74/640 X |
| 3,501,978 | 3/1970 | Ferrell | 74/640 |
| 3,187,605 | 6/1965 | Stiff | 74/640 |
| 3,374,372 | 3/1968 | Tinder et al. | 74/640 X |
| 3,427,898 | 2/1969 | Mayer | 74/640 |
| 3,482,770 | 12/1969 | Nelson | 74/640 X |
| 3,524,362 | 8/1970 | Hagel | 74/640 X |
| 3,529,491 | 9/1970 | Stauber | 74/640 |
| 3,532,005 | 10/1970 | Bremner, Jr. et al. | 74/640 |

*Primary Examiner*—Arthur T. McKeon
*Attorneys*—W. Bigelow Hall, Richard A. Wise and Carl E. Johnson

ABSTRACT: In contrast to providing a rigid circular spline for cooperating with a coaxial flexspline to effect spline-meshing at spaced circumferential localities, in accordance with conventional harmonic-drive actuation, there is provided in coaxial relation in a speed changer a "flexspline" having a rough working surface, and a cooperative "circular spline" elastomer, the latter being of suitable durometer and initially formed with a diameter slightly less than the root diameter of the "flexspline" measured at its major axis whereby, at spaced circumferential localities, the rough surface is impressed in driving relation into the elastomer. An axial deflection version is also disclosed. Alternatively, in either version the deflectable member may be elastomeric and the nondeflected member formed with a nonskid-cooperating surface.

PATENTED SEP 14 1971 3,604,287

Inventor
Donald R. Humphreys
By his Attorney
Carl E. Johnson.

PATENTED SEP 14 1971

3,604,287

3,604,287

MODIFIED HARMONIC-DRIVE ACTUATORS

BACKGROUND OF THE INVENTION

This invention relates to motion-transmitting devices, and more particularly to a modified harmonic-drive-type actuator. As exemplified herein the invention is especially concerned with rotary-to-rotary power transmission wherein, of a pair of relatively rotatable members in coaxial relation, one is radially (and or axially deflectible to carry a circumferential wave and has a rough working surface adapted thus to be impressed in progressive, substantially nonskid, reactive relation on a circular elastomeric second member.

As disclosed in U.S. PAT. NO. 2,906,143, issued Sept. 29, 1959, for example, harmonic-drive actuators customarily employ three basic elements: a flexspline, a rigid circular spline coaxial therewith, and a wave-generator means for effecting deflection of the flexspline and meshing of the spline members at spaced localities, and for causing a wave of deflection to be generated in the flexspline. Any one of the three elements may serve as an input and one of the other two may serve as an output member. Perhaps the outstanding characteristics of such actuators are their high torque capabilities for their size, and their precision performance with very low backlash. In applications where, for a corresponding size unit, the torque requirements may be lower or imprecise drive is acceptable, it is often desirable to provide a design affording more economical production.

One prior art approach to the problem of providing lower cost torque-transmitting devices of the harmonic-drive type is disclosed, for instance, in U.S. PAT. NO. 3,304,809, issued Feb. 21, 1967 in the name of J.S. Hellen, wherein conjoint radial distortion is imposed on two coaxial nontoothed, resilient tubular members. Other reducers not of a harmonic-drive-type variant are disclosed for example, in U.S. PAT. NO. 3,427,878, issued Feb. 18, 1969 in the name of F. Mayer, wherein at least one rolling element is moved along a flexible member to press it against a rigid-driven member, no slippage occurring. Still other arrangements are known to practice nontoothed toothed or friction drives wherein slippage of indeterminate degree is expected.

SUMMARY OF THE INVENTION

In the light of the foregoing, and aside from gaining cost advantage due to elimination of the need for precision toothcutting in one member, main objects of the drive of the present invention are to provide in a rotary actuator quiet operation, avoidance of the necessity for meeting exacting tolerances, and maintenance of reasonable good torque-capability for size and weight.

To the ends stated a coaxial wave-generator means, which may be of conventional construction and usually elliptoidal to impose two lobes on the deflectible member, is employed, but it will be understood that three or more lobed wave generators may be provided as in other harmonic-drive actuators. At the localities of interengagement, the rough surface of one rotary member (encompassing for instance, patterned or nonpatterned teeth, knurling, protrusions, ridges or other nonskid tread configuration is impressed on the otherwise relatively smooth coacting rotary member. A root diameter of the rough surface is selected to insure good driving relation, i.e. full embedment and little, if any slippage with the smoother member.

BRIEF DESCRIPTION OF THE DRAWINGS

The foregoing and other features of the invention including various novel details of construction and combinations of parts will now be more particularly described in connection with certain preferred illustrated embodiments and with reference to the accompanying drawings in which;

FIG. 4 is a perspective detail of the flexing member of FIGS. 1 and 2 or FIG. 3 (roughened by longitudinal splines), FIGS. 5 and 6 perspectively illustrate "flexspline" surfaces optionally "roughened" respectively by knurling, serrations or the like;

DESCRIPTION OF THE PREFERRED EMBODIMENTS

Figure 1:
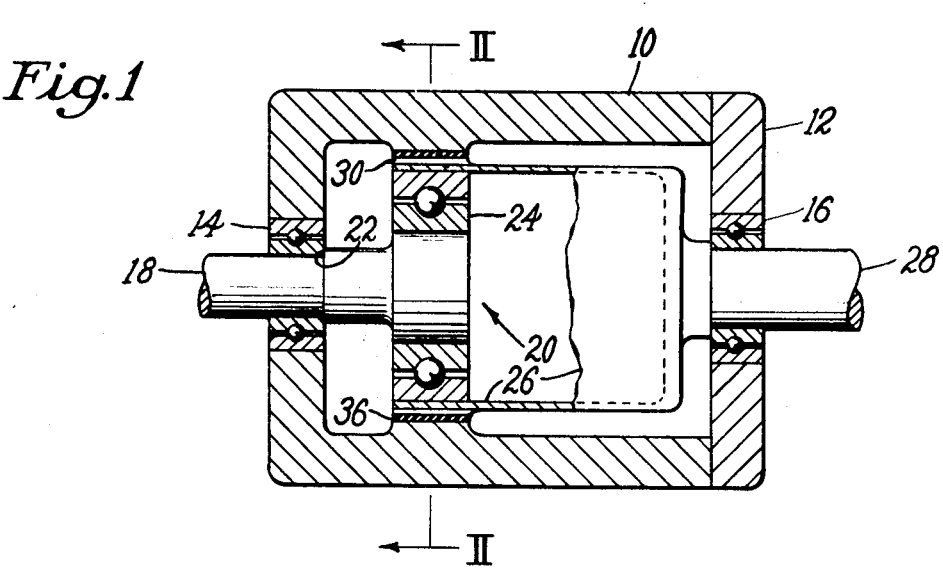
FIG. 1 is longitudinal section of a speed changer embodying one form of my invention, a tubular flexspline having externally roughened surface, as by spline-teeth formation, cooperating with a smooth elastomeric ring.
Figure 2:
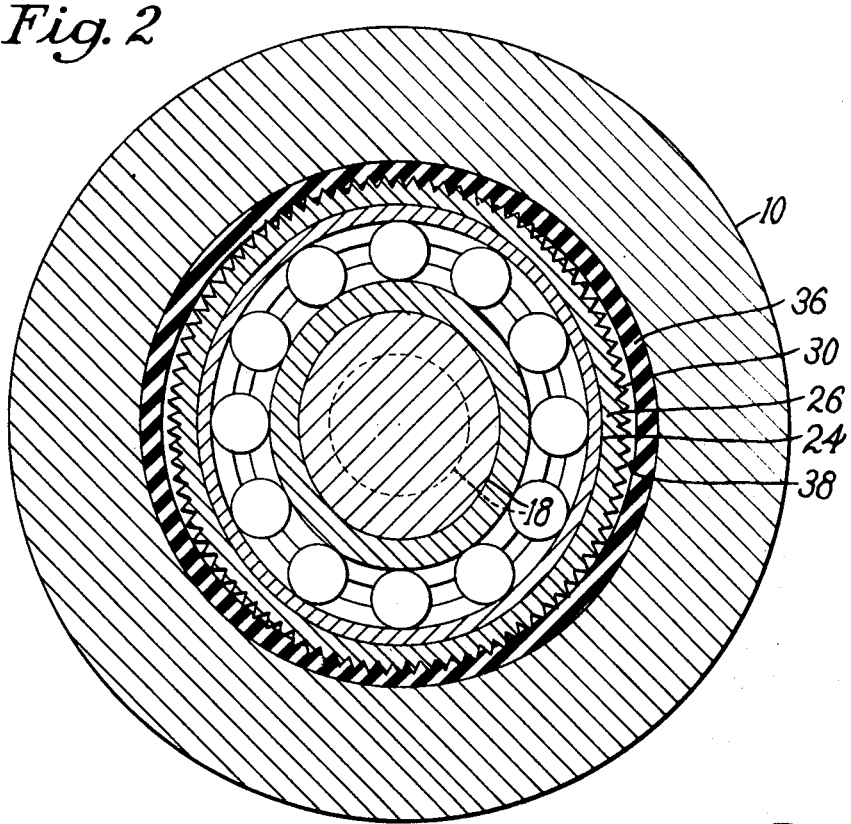
FIG. 2 is an enlarged transverse section taken on the line II—II of FIG. 1 and showing a vertical major axis extending through diametrically opposed localities of interengagement.

In FIGS. 1 and 2 a fixed housing 10 and its end cap 12 respectively are fitted with aligned bearings 14, 16. Extending through the bearing 14 is an input shaft 18 having on its inner end an elliptoidal wave-generator assembly 20. Other shapes of wave generator employing more than two lobes may be employed when desirable. For preventing withdrawal of the shaft 18 in one direction it may be formed with a collar 22. As shown the wave generator 20 preferably includes a ball bearing 24 for imparting and rotating the elliptoidal shape in the open end of a tubular flexspline 26, the closed end of which may be integral with an output shaft 28 journaled in the bearing 16.

As thus far described the speed changer of FIGS. 1 and 2 may be considered conventional harmonic-drive design in that the radially deflectible member 26 is shown as having external spline teeth 30 circumferentially disposed. However, in keeping with this invention, in lieu of the teeth 30 the flexspline 26 may be provided alternatively with a surface roughened by other than splines or teeth as for instance by knurling 32 (FIG. 5), or serrations 34 (FIG. 6), circumferential dimples or projections or other printings, patterned or nonpatterned. The teeth 30 and/or otherwise roughened driving surfaces of the flexspline 26 is arranged to react on an elastomeric ring 36 anchored, for instance by adhesive, to the interior of the housing 10. It will be appreciated that this ring takes the place of a so-called rigid circular spline employed in harmonic drive units, and is of high durometer but formed with relatively smooth internal annular surface 38 (FIG. 2) which, in major axis localities, is impressed with the roughened surface, splines 30 or other rough configurations of the radially deflectible member 26. The inside diameter of the circular elastomeric ring 36 is, by manufacture slightly less than the root diameter of the roughened coacting surface of the deflected member measured at its major axis whereby the pring of the rotating roughened surface is indented in and impressed on the stationary elastomeric ring 36.

Significant torque with quiet performance is obtained from the assembly described. The drive ratio is established by the shape of the wave generator, and confirmed by the interengagement of the deflected member 26 and the impressed ring. Advantageously, if spline teeth 30 be used their shape need not be cut to exact or uniform dimensions nor does any other nontoothed configurations or projections need to be exactly shaped. Preferably when spline teeth or other projections are employed, the thickness of the elastomer is about twice the tooth height or maximum projection height.

Figure 3:
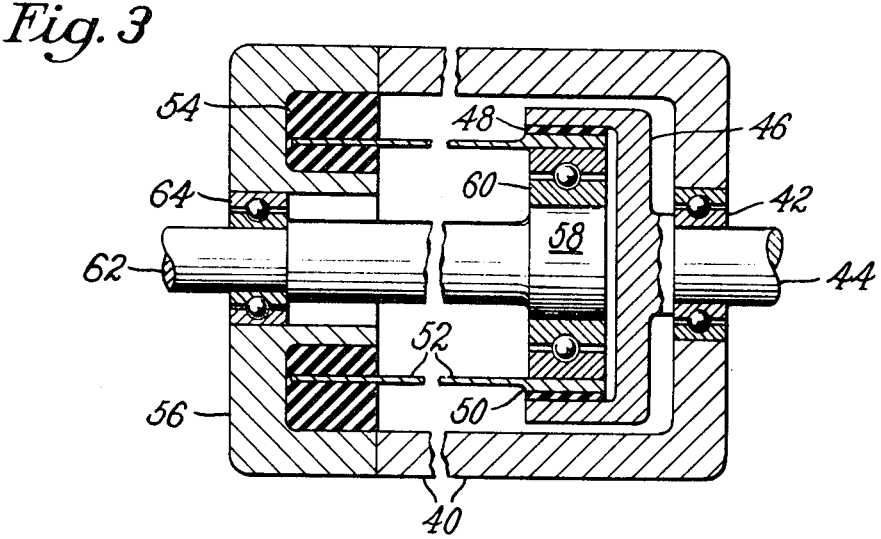
FIG. 3 is a variant on the actuator of FIGS. 1 and 2, the flexspline now being anchored to a housing and an elastomeric ring carrying the output.

FIG. 3 is a variant, usually axially shortened, form of speed changer wherein instead of the deflecting member serving as an output the circular or elastomer carrying member acts as the output. A housing 40 is fitted with a bearing 42 for receiving an output shaft 44 integral with a cup-shaped end 46. Secured to the inner circumference of the cup portion is an elastomeric ring 48 for cooperating with circumferential spline teeth 50 formed on one end of an open-ended deflectible member 52. The other end of the member 52 is anchored against rotation in an elastomeric annulus 54 nested in an end cap 56 secured to the housing 40. For driving the shaft 44 through its ring 48 a wave shape is rotated by means of a wave generator 58 for instance elliptoidal and its bearing 60 on one end of a rotary input shaft 62, the latter extending through a bearing 64 in the cap 56. The annulus 54 is of lower durometer than that of the ring 48 and holds the member 52 against rotation while permitting circumferential travel of a much-reduced height of wave in the anchored end of the member 52.

Though not so shown in FIG. 3 arrangement, it will be appreciated that alternatively the member 52 may be economically made as a tubular extrusion having its external roughness or projections 50 extending over the entire length. They then additionally would serve to aid in anchoring the member 52 in the annulus 54.

Figure 4:
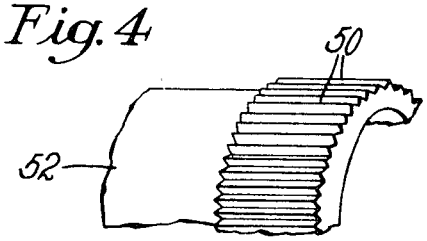
Figure 5:
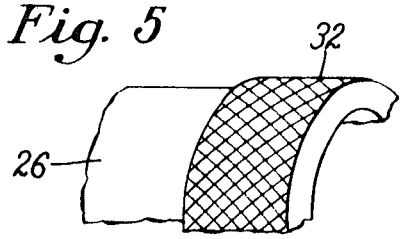
Figure 6:
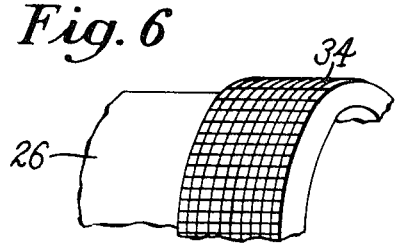
Figure 7:
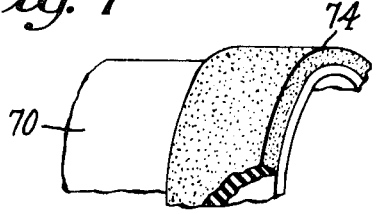
FIG. 7 shows in perspective a portion of the flexing member carrying an elastomer working ring engageable by a roughened driving ring.
Figure 8:
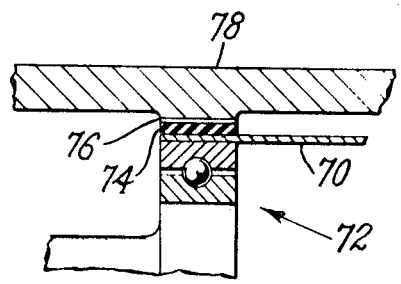
FIG. 8 is an axial detail view corresponding to a portion of FIG. 1 but with a splined member now external of the elastomer.

FIGS. 4-6 inclusive illustrate radially deflectible roughened tubular members of the type employable in the units of FIG. 1 or FIG. 3 type construction, but FIG. 8 shows an inversion of the FIG. 1 or FIG. 3 types in that a deflectible tubular member 70 cooperative with a wave generator 72 now has secured on the member an elastomeric ring 74 as indicated in FIG. 7. The smooth ring 74 is deflectible to elliptoidal or other lobar shape and is interengaged with circularly disposed spline teeth 75 (or other non skid configurations of the types referred to formed on the inside of a stationary housing 78. Rotary input to the wave generator 72 accordingly results in rotary driving of the member 70 about their common axis.

Figure 9:
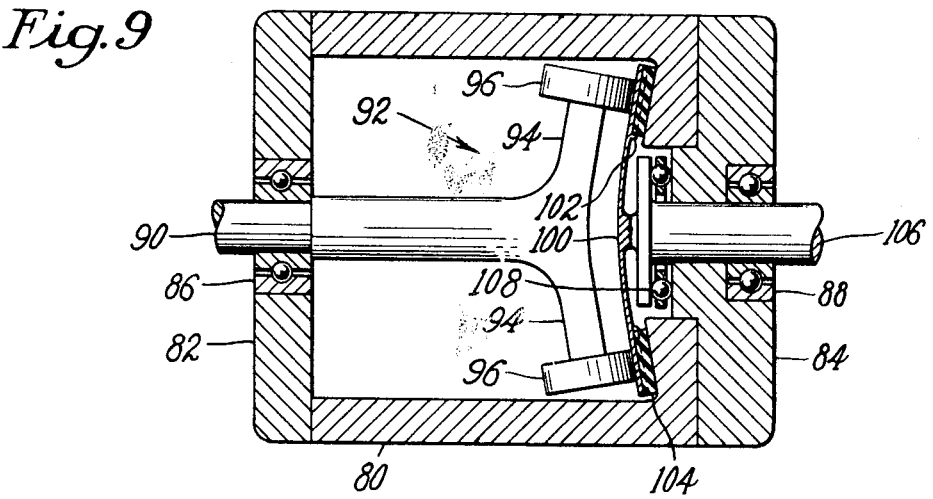
FIG. 9 is an axial section showing a further alternate form of the invention wherein deflection is axial rather then radial.

FIG. 9 illustrates an axial deflection version of the invention. A stationary housing 80 has end caps 82, 84 respectively fitted with coaxial bearings 86, 88. An input shaft journaled in the bearing 86 may be assumed to rotate a wave generator generally designated 92 and in this instance comprising two opposed arms 94 respectively carrying a roller 96. These rollers, which alternatively may have the form of other rolling means, for example balls, and may be of rubberlike material where desired, are held in their operating positions axially as by a collar 98 on the shaft and engaged by the inner face of the bearing 86. As thus axially disposed the rollers 96 axially engage and deflect at opposed circumferential localities a face of a normally planar disk 100, the opposite face of which is roughened in one of the ways above indicated, in this instance by the formation of radial splines 102. The splines 102, or other rough formation employed, are hence caused to be embedded in the confronting face of an elastomeric ring 104 bonded or otherwise secured to a portion of the housing 80 substantially normal to the axis of rotation.

When wave generator 92 rotates to progress the localities of "meshing" or embedment between the disk 100 and the stationary ring 104, the disk is caused to rotate thereby driving an output shaft 106 connected to the disk and journaled in the bearing 88. Preferably a thrust bearing 108 is interposed between the end cap 84 and a flange 110 secured to the shaft 106. The localities of embedment are circumferentially spaced by localities of nonembedment, in a manner generally resembling that in FIG. 2 except that in the FIG. 9 arrangement "meshing" occurs substantially in one plane. Though not shown, a tri-lobar arrangement may be provided by having three rollers 96 respectively mounted on arms 94 angularly spaced by 120°.

Figure 10:
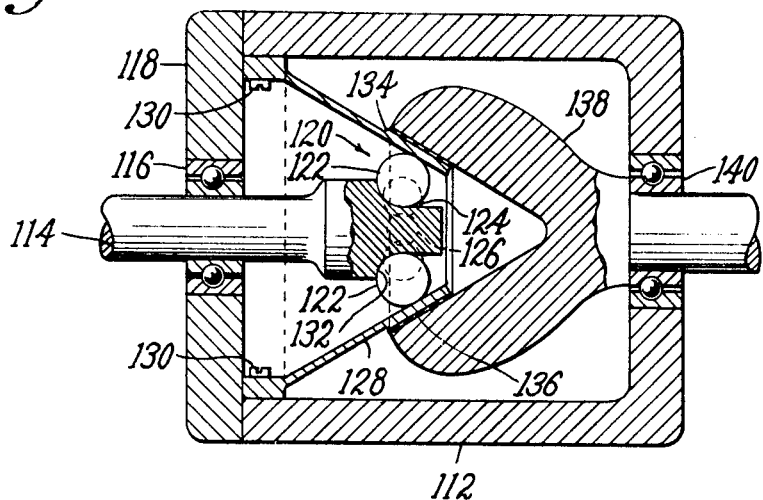
FIG. 10 is an axial section illustrating an embodiment wherein one of the meshing members is angularly deflected and the elastomeric member carries output

In FIG. 10 a stationary housing 112 receives an input shaft 114 journaled in a bearing 116 fitted in an end plate 118. The inner end of the shaft 114 is enlarged to provide for a wave generator generally designated 120 and in this case consists of pairs of balls 122, 124 and 126. The opposed balls 122 are largest to provide a major axis having localities of engagement with a conical deflecting member 128 anchored at its base to the housing by means of screws 130. The opposed balls 126 are smallest and lie on a minor axis, while the intermediate sized balls 124 serve as spacers, all of the balls rolling in contact with an arcuate shoulder 132 circumferentially formed on the shaft 114. The exterior of the member 128 opposite to the path of the balls is roughened, for instance by the provision of splines 134 or other configuration, and hence adapted to be embedded upon deflection at major axis localities into a mating conical elastomeric ring 136 which is secured on an output member 138. The latter is journaled in a bearing 140 in the housing 112.

In the FIG. 10 arrangement-meshing or embedment is variable as determined by the axial position of the input shaft 114. By shifting it to the right as viewed in FIG. 10 increasing angular deflection is effected and a more positive drive of the output shaft 138 is obtained.

In each of the exemplary embodiments described the deflected member or its interacting member may be roughened, the other being relatively smooth, and either may be the elastomer. The durometer of the elastomer is ordinarily selected to enable full embedment of the roughened surface in the normally smooth-reacting surface in order to provide drive with little or no slippage. Where slippage to a degree is acceptable, factors in addition to durometer may be considered such as quietness of operation attained and reduction in the embedment of the rough surface into the smooth surface. Perhaps the outstanding advantage of the invention is the possible reduction in manufacturing cost attained by eliminating the need for conventional coupling between input and output members, the possibility of avoiding tooth-cutting, and doing away with the need for exacting tolerances.

It will be understood that, while the wave-generator means 20 is herein shown as mechanical, it may be either hydraulic or electrical when preferred.

Having thus described my invention, what I claim as new and desire to secure by Letters Patent of the United State is:

1. In an actuator of the type wherein, of two coaxial relatively rotatable, cooperating members, one is deflectible by a wave generator into lobar shape to carry a circumferential strain wave and the other is substantially nondeflectible radially, the improvement which consists in providing a rough circumferential surface defined by driving formations in either one of said two members, an an elastomeric ring of selected durometer on the other of the said two members having a smooth, deformable surface arranged to receive the embedment of the rough surface driving formations at circumferentially spaced localities, whereby one of the two members is relatively rotated when the other is held against rotation during operation of the wave-generator means.

2. An actuator as set forth in claim 1 wherein the deflectible member is formed with the rough surface, the driving formations of said rough surface being nonuniformly spaced, and said other member is provided with an elastomeric ring of a thickness of at least about twice the depth of the projections in the rough surface.

3. An actuator as set forth in claim 1 wherein the deflectible member is tubular and open at both ends, the rough surface being at one of said ends and the other end of the tubular member is anchored in a fixed elastomeric ring of durometer adequate to prevent rotation of the tubular member about its axis yet allow a circumferential wave of deflection of a height reduced from that generated by the wave-generator means in said one end of the tubular member.

4. An actuator as set forth in claim 1 wherein the deflection is radial and the root diameter of the roughened surface of the deflectible member measured along its major axis is slightly more than the inside diameter of the elastomeric ring, as manufactured coacting with said roughened surface.

5. A rotary actuator comprising a stationary housing rotatably supporting coaxial input and output shafts, and elliptoidal wave generator driven by the input shaft about the common axis, a hollow member having a roughened surface characterized by irregularly spaced and nonuniformly shaped formations deflectible circumferentially at spaced localities relatively to said axis by the wave generator while secured against rotation to the housing, and an elastomeric member operatively connecting an end of the output shaft to the hollow member by engagement and embedment therewith at said spaced circumferential localities.

6. An actuator as set forth in claim 5 wherein the nonrotary hollow member has its roughened surface in the form of a truncated cone, and the input shaft is axially shiftable to urge the wave generator into and out of operating engagement with the hollow member.

7. A rotary actuator comprising a stationary housing rotatably supporting coaxial input and output shafts, wave-generator means mounted on the input shaft and including circumferentially spaced rolling elements, an elastomeric face ring secured in the housing and extending about the common axis in a plane substantially normal thereto, and an axially deflectible disk secured on the inner end of the output shaft and interposed between the operating path of the rolling elements and said face ring, at least one of the confronting faces of the disk and the elastomeric ring being roughened with driving formations whereby interacting embedment of these formations is effected by the wave-generator elements in the relatively smooth coacting face of the other of the disk and ring at circumferentially spaced localities.

8. An actuator as set forth in claim 7 wherein the confronting face of the deflectible disk is formed with nonuniform working projections and the ring has a smooth face for embedding said projections.